(12) United States Patent
Chang et al.

(10) Patent No.: US 11,702,133 B2
(45) Date of Patent: Jul. 18, 2023

(54) YAW STABILITY CONTROL SYSTEM FOR A MOTOR VEHICLE

(71) Applicant: GM Global Technology Operations LLC, Detroit, MI (US)

(72) Inventors: Insu Chang, Troy, MI (US); Jun-mo Kang, Ann Arbor, MI (US); SeungHwan Keum, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 196 days.

(21) Appl. No.: 17/236,422

(22) Filed: Apr. 21, 2021

(65) Prior Publication Data

US 2022/0340198 A1 Oct. 27, 2022

(51) Int. Cl.
| | |
|---|---|
| *B62D 5/04* | (2006.01) |
| *B60W 30/18* | (2012.01) |
| *B60K 26/04* | (2006.01) |
| *G06F 17/00* | (2019.01) |
| *B62D 3/02* | (2006.01) |
| *B62D 6/00* | (2006.01) |
| *B62D 15/02* | (2006.01) |
| *B60R 11/04* | (2006.01) |

(52) U.S. Cl.
CPC .............. *B62D 6/003* (2013.01); *B60R 11/04* (2013.01); *B62D 5/0481* (2013.01); *B62D 6/008* (2013.01); *B62D 15/021* (2013.01); *B60R 2300/804* (2013.01)

(58) Field of Classification Search
None
See application file for complete search history.

(56) References Cited

U.S. PATENT DOCUMENTS

| | | | |
|---|---|---|---|
| 6,865,468 B2 | 3/2005 | Lin et al. | |
| 6,923,282 B2 | 8/2005 | Chernoff et al. | |
| 6,968,261 B2 | 11/2005 | Ghoneim et al. | |
| 2002/0007239 A1* | 1/2002 | Matsumoto | ........ B60K 23/0808 701/41 |
| 2005/0125153 A1* | 6/2005 | Matsumoto | ......... B60T 8/17557 701/41 |
| 2006/0015229 A1* | 1/2006 | Lange | ...................... B62D 1/00 701/41 |

(Continued)

*Primary Examiner* — Adam D Tissot
*Assistant Examiner* — Laura E Linhardt
(74) *Attorney, Agent, or Firm* — Vivacqua Crane PLLC

(57) ABSTRACT

A yaw stability control system is provided for a motor vehicle. The system includes one or more cameras, a plurality of wheel speed sensors, a yaw angle sensor, and a steering angle sensor. The system further includes an electric motor connected to a reaction wheel. The system further includes a processor and a memory including instructions such that the processor is programmed to: determine a desired yaw angle of the motor vehicle based on a video signal, speed signals, a yaw signal, and a steering signal. The processor is further programmed to generate an actuation signal associated with the desired yaw angle. The electric motor angularly rotates the reaction wheel at a predetermined angular rate in a predetermined rotational direction to produce a counter-acting torque that rotates the motor vehicle to the desired yaw angle, in response to the electric motor receiving the actuation signal from the processor.

20 Claims, 3 Drawing Sheets

(56) References Cited

U.S. PATENT DOCUMENTS

| | | | | |
|---|---|---|---|---|
| 2012/0130593 A1* | 5/2012 | Davis | ............... | B62D 1/286 |
| | | | | 701/41 |
| 2016/0152238 A1* | 6/2016 | Mita | ............... | B60K 6/387 |
| | | | | 180/197 |
| 2021/0237716 A1* | 8/2021 | Prasad | ............... | B60L 53/38 |
| 2022/0281520 A1* | 9/2022 | Fujimoto | ............ | B62D 15/025 |

* cited by examiner

YAW STABILITY CONTROL SYSTEM FOR A MOTOR VEHICLE

INTRODUCTION

The present disclosure relates to vehicle stability control systems, and more particularly to a yaw stability control system having a reaction wheel for re-directing a motor vehicle in a direction intended by a driver.

Modern yaw stability control systems actuate a brake for one or more wheels to adjust a yaw angle of a motor vehicle during, for example, a sudden high-speed lane change where the driver maneuvers the motor vehicle around an obstacle by steering in several different directions in quick succession. In particular, upon discovering the obstacle, the driver may suddenly steer to the left, and the system can suddenly and sharply actuate a brake for the rear left wheel to assist with steering the vehicle toward the left. After the vehicle has driven past the obstacle, the driver may attempt to return the vehicle to its original driving lane by sharply steering the vehicle back toward the right, and the system can suddenly actuate a brake for the front left wheel to prevent the rear wheels from skidding toward the left.

Because the yaw stability control systems re-direct vehicles by selectively applying the brake for one or more wheels, these systems can perform better in dry road conditions than wet road conditions. The performance of the brakes can be adversely affected by, e.g., black ice, that provides low rolling resistance even when the vehicle is travelling at low speeds, e.g., under 25 MPH.

Thus, while existing vehicle stability control systems achieve their intended purpose, there is a need for a new and improved yaw stability control system that addresses these issues.

SUMMARY

According to several aspects of the present disclosure, a yaw stability control system is provided for a motor vehicle having a plurality of wheels and a longitudinal centerline. The system includes one or more cameras, which are adapted to be mounted to the motor vehicle and directed along the longitudinal centerline of the motor vehicle. The camera generates a video signal, in response to the camera capturing one or more lane markings associated with a boundary of a driving lane. The system further includes a plurality of wheel speed sensors for generating a plurality of speed signals that correspond to a speed of an associated one of the wheels. The system further includes a yaw angle sensor for generating a yaw signal that corresponds to a current yaw angle of the motor vehicle. The system further includes a steering angle sensor for generating a steering signal that corresponds to a steering angle associated with a direction intended by the driver. The system further includes a reaction wheel, which has a moment of inertia and is adapted to mount to the motor vehicle for angularly rotating within a horizontal plane. The system further includes an electric motor connected to the reaction wheel for angularly rotating the reaction wheel. The system further includes a processor that is coupled to the camera, the wheel speed sensors, the yaw angle sensor, the steering angle sensor, and the electric motor. The system further includes a memory including instructions such that the processor is programmed to: determine a desired yaw angle of the motor vehicle based on the video signal, the speed signals, the yaw signal, and the steering signal. The processor is further programmed to generate an actuation signal associated with the desired yaw angle. The electric motor angularly rotates the reaction wheel at a predetermined angular rate in a predetermined rotational direction to produce a counter-acting torque that rotates the motor vehicle to the desired yaw angle, in response to the electric motor receiving the actuation signal from the processor.

In one aspect, the processor is further programmed to determine an estimated yaw angle between the boundary of the driving lane and the longitudinal centerline of the motor vehicle based on the video signal. The processor is further programmed to compare the estimated yaw angle to the desired yaw angle. The processor is further programmed to generate the actuation signal, in response to the processor determining that the estimated yaw angle is above the desired yaw angle.

In another aspect, the processor is further programmed to determine the current yaw angle, in response to the processor determining that the camera did not capture the lane markings.

In another aspect, the yaw angle sensor includes a gyroscope and/or an inertial measurement unit (IMU).

In another aspect, the processor is further programmed to determine a wheel acceleration, in response to the processor receiving the speed signals. The processor is further programmed to compare the wheel acceleration to a predetermined acceleration threshold. The processor is further programmed to determine a slip condition, in response to the processor determining that the wheel acceleration is above the predetermined acceleration threshold.

In another aspect, the wheels include first and second wheels. The wheel speed sensors include a first wheel sensor for generating a first speed signal associated with the speed of the first wheel and a second wheel sensor for generating a second speed signal associated with the speed of the second wheel. The processor is further programmed to compare the speed of the first wheel to the speed of the second wheel, in response to the processor receiving the first and second speed signals In another aspect, the reaction wheel is a ring or a solid disc.

In another aspect, the wherein the electric motor is an axial flux motor.

In another aspect, the wherein the axial flux motor is an axial brushed DC motor.

According to several aspects of the present disclosure, a motor vehicle includes a body extending along a longitudinal centerline between front and rear ends. The motor vehicle includes a plurality of wheels coupled to the body, with the wheels including at least two drive wheels. The motor vehicle further includes a yaw stability control system adapted to be mounted to the body. The system includes one or more cameras, which are adapted to be mounted to the motor vehicle and directed along the longitudinal centerline of the motor vehicle. The camera generates a video signal, in response to the camera capturing one or more lane markings associated with a boundary of a driving lane. The system further includes a plurality of wheel speed sensors for generating a plurality of speed signals that correspond to a speed of an associated one of the wheels. The system further includes a yaw angle sensor for generating a yaw signal that corresponds to a current yaw angle of the motor vehicle. The system further includes a steering angle sensor for generating a steering signal that corresponds to a steering angle. The system further includes a reaction wheel, which has a moment of inertia and is adapted to mount to the motor vehicle for angularly rotating within a horizontal plane. The system further includes an electric motor connected to the reaction wheel for angularly rotating the reaction wheel. The system further includes a processor that is coupled to the camera, the wheel speed sensors, the yaw angle sensor, the steering angle sensor, and the electric motor. The system further includes a memory including instructions such that the processor is programmed to: determine a desired yaw angle of the motor vehicle based on the video signal, the speed signals, the yaw signal, and the steering signal. The processor is further programmed to generate an actuation signal associated with the desired yaw angle. The electric motor angularly rotates the reaction wheel at a predetermined angular rate in a predetermined rotational direction to produce a counter-acting torque that rotates the motor vehicle to the desired yaw angle, in response to the electric motor receiving the actuation signal from the processor.

In one aspect, the body includes a trunk, and the reaction wheel and the electric motor are disposed in the trunk.

In another aspect, the processor is further programmed to determine an estimated yaw angle between the boundary of the driving lane and the longitudinal centerline of the motor vehicle based on the video signal. The processor is further programmed to compare the estimated yaw angle to the desired yaw angle. The processor is further programmed to generate the actuation signal, in response to the processor determining that the estimated yaw angle is above the desired yaw angle.

In another aspect, the processor is further programmed to determine the current yaw angle, in response to the processor determining that the camera did not capture the lane markings.

In another aspect, the yaw angle sensor includes a gyroscope and/or an inertial measurement unit (IMU).

In another aspect, the processor is further programmed to determine a wheel acceleration, in response to the processor receiving the speed signals. The processor is further programmed to compare the wheel acceleration to a predetermined acceleration threshold. The processor is further programmed to determine a slip condition, in response to the processor determining that the wheel acceleration is above the predetermined acceleration threshold.

In another aspect, the wheels includes first and second wheels, and the wheel speed sensors includes a first wheel sensor for generating a first speed signal associated with the speed of the first wheel and a second wheel sensor for generating a second speed signal associated with the speed of the second wheel. The processor is further programmed to compare the speed of the first wheel to the speed of the second wheel, in response to the processor receiving the first and second speed signals.

In another aspect, the reaction wheel is a ring or a solid disc.

In another aspect, the electric motor is an axial flux motor.

According to several aspects of the present disclosure, a method of operating a yaw stability control system is provided for a motor vehicle. The motor vehicle includes a body extending along a longitudinal centerline between front and rear ends and a plurality of wheels coupled to the body. The method includes one or more cameras generating a video signal, in response to the camera capturing one or more lane markings associated with a boundary of a driving lane. The method further includes a plurality of wheel speed sensors generating a plurality of speed signals that correspond to a speed of an associated one of the wheels. The method further includes a yaw angle sensor generating a yaw signal that corresponds to a current yaw angle of the motor vehicle. The method further includes a steering angle sensor generating a steering signal that corresponds to a steering angle. The method further includes a memory including instructions and a processor determining a desired yaw angle of the motor vehicle based on the video signal, the speed signals, the yaw signal, and the steering signal. The method further includes the processor generating an actuation signal associated with the desired yaw angle. The method further includes an electric motor angularly rotating a reaction wheel at a predetermined angular rate in a predetermined rotational direction within a horizontal plane to produce a counter-acting torque that rotates the motor vehicle to the desired yaw angle, in response to the electric motor receiving the actuation signal from the processor.

In one aspect, the method further includes the processor determining an estimated yaw angle between the boundary of the driving lane and the longitudinal centerline of the motor vehicle based on the video signal. The method further includes the processor comparing the estimated yaw angle to the desired yaw angle and generating the actuation signal, in response to the processor determining that the estimated yaw angle is above the desired yaw angle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one example of a motor vehicle 100 having a yaw stability control system 102 ("system") for generating a counter-acting torque 104 that compensates for a momentum 106 that different road conditions impart on the motor vehicle 100 via individual wheels. Individual wheels may contact a road surface covered with ice, and other wheels may contact a road surface free of ice, such that the latter have a comparably higher rolling resistance. The difference in rolling resistance between the individual wheels can impart the momentum 106 to the motor vehicle 100 that steers the vehicle 100 in a direction not intended by the driver. The system 102 detects conditions associated with this momentum 106 and generates the counter-acting torque 104 to steer the vehicle 100 back in the original direction intended by the driver. As described in detail below, the system 102 includes a reaction wheel, an electric motor, and a computer that are adapted to attach to a body of the vehicle in a trunk, a frunk, or passenger cabin of the vehicle. The reaction wheel, the electric motor, and the computer are removable from the body, such as a summer season or in locations where the roads are free of ice and snow. In other examples, the reaction wheel, the electric motor, and the computer can be integrated within other portions of the vehicle by any suitable installment methods.

Figure 2:
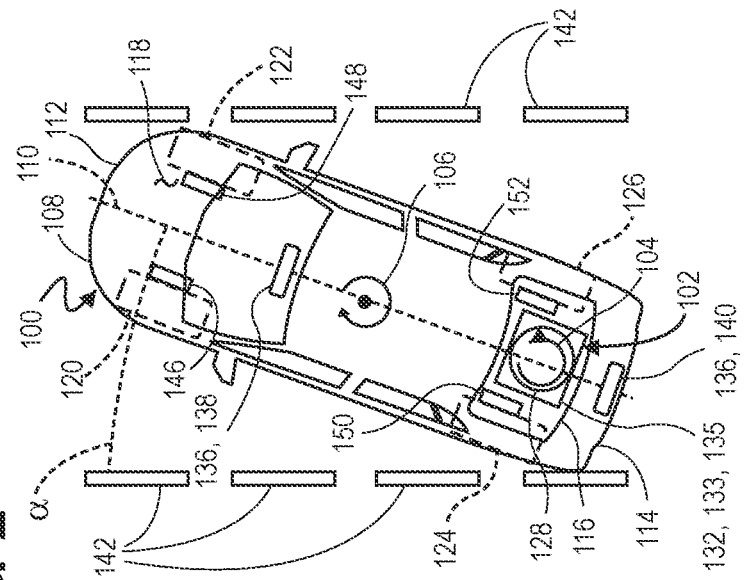
FIG. 2 is a top view of the motor vehicle of FIG. 1, illustrating road conditions imparting a clockwise momentum to the motor vehicle and the system having a reaction wheel producing a counter-acting torque to re-direct the motor vehicle in a counterclockwise direction.
Figure 1:
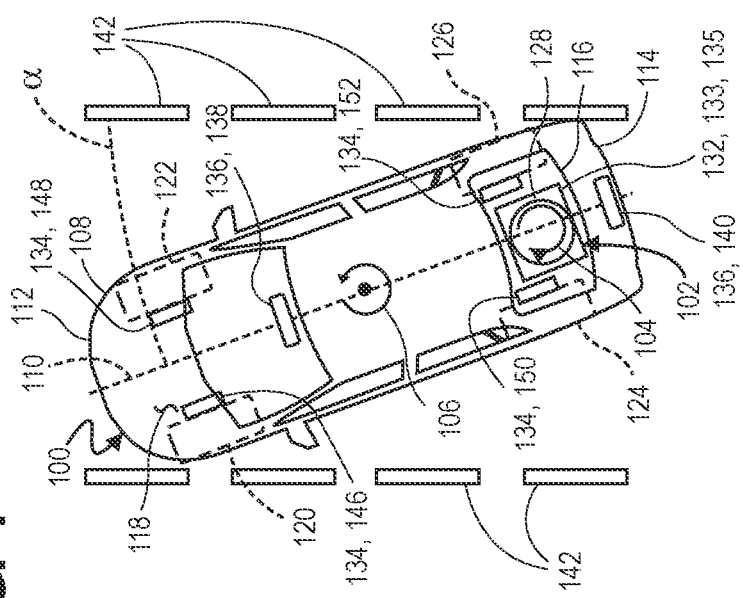
FIG. 1 is a top view of a motor vehicle having a yaw stability control system, illustrating road conditions imparting a counterclockwise momentum to the motor vehicle and the system having a reaction wheel producing a counter-acting torque to re-direct the motor vehicle in a clockwise direction.

Referring to FIGS. 1 and 2, an exemplary motor vehicle 100 has a body 108 that extends along a longitudinal centerline 110 between front and rear ends 112, 114. The motor vehicle 100 further includes a trunk 116 or a rear luggage compartment adjacent to the rear end 114. In another example, the motor vehicle 100 can include a frunk 118 or a front luggage compartment adjacent to the front end 112. The motor vehicle 100 further includes a plurality of wheels 120, 122, 124, 126 coupled to the body 108, with the wheels including at least two drive wheels. In one example, the vehicle 100 is a front-wheel drive vehicle such that an engine (not shown) of the vehicle provides power to a front left wheel 120 and a front right wheel 122. In other examples, the vehicle can be a rear-wheel drive vehicle with the engine providing power to the two rear wheels or an all-wheel drive vehicle with the engine providing power to all wheels for propelling the vehicle.

Figure 4:
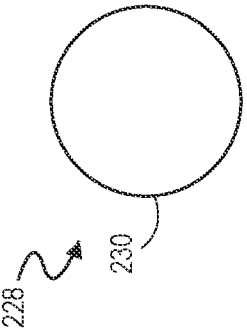
FIG. 4 is a plan view of another example of a reaction wheel of FIG. 1, illustrating the reaction wheel being a solid disc.
Figure 3:
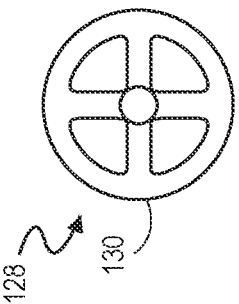
FIG. 3 is a plan view of the reaction wheel of FIG. 1, illustrating the reaction wheel being a ring.

The system 102 includes the reaction wheel 128, which has a moment of inertia and is adapted to mount to the motor vehicle 100 for angularly rotating within a horizontal plane to produce a counter-acting torque 104 to re-direct the vehicle 100 in the original direction intended by the driver. In this example, the reaction wheel 128 is a ring 130 (FIG. 3) disposed within the trunk 116 of the vehicle 100. The ring 130 has a rotational inertia with mass distributed farthest from the axis of rotation. Another example of a reaction wheel 228 can be a solid disc 230 (FIG. 4). Where the ring 130 and the solid disc 230 have a common diameter, the ring 130 can have a lower mass and a higher rotational inertia as compared to the solid disc 230, such that the ring 130 can generate a higher counter-acting torque and add less weight to the vehicle 100 as compared to the solid disc 230.

The system 102 further includes the electric motor 132 connected to the reaction wheel 128 for angularly rotating the reaction wheel 128. In one non-limiting example, the electric motor 132 is an axial flux motor 133, which more specifically is an axial brushed DC motor 135, disposed in the trunk 116. The brushed motor can be coupled to the reaction wheel by a gear box to incrementally accelerate and decelerate the reaction wheel. It is contemplated that the system 102 can include other suitable motors integrated in any suitable portion of the vehicle 100.

Figure 5:
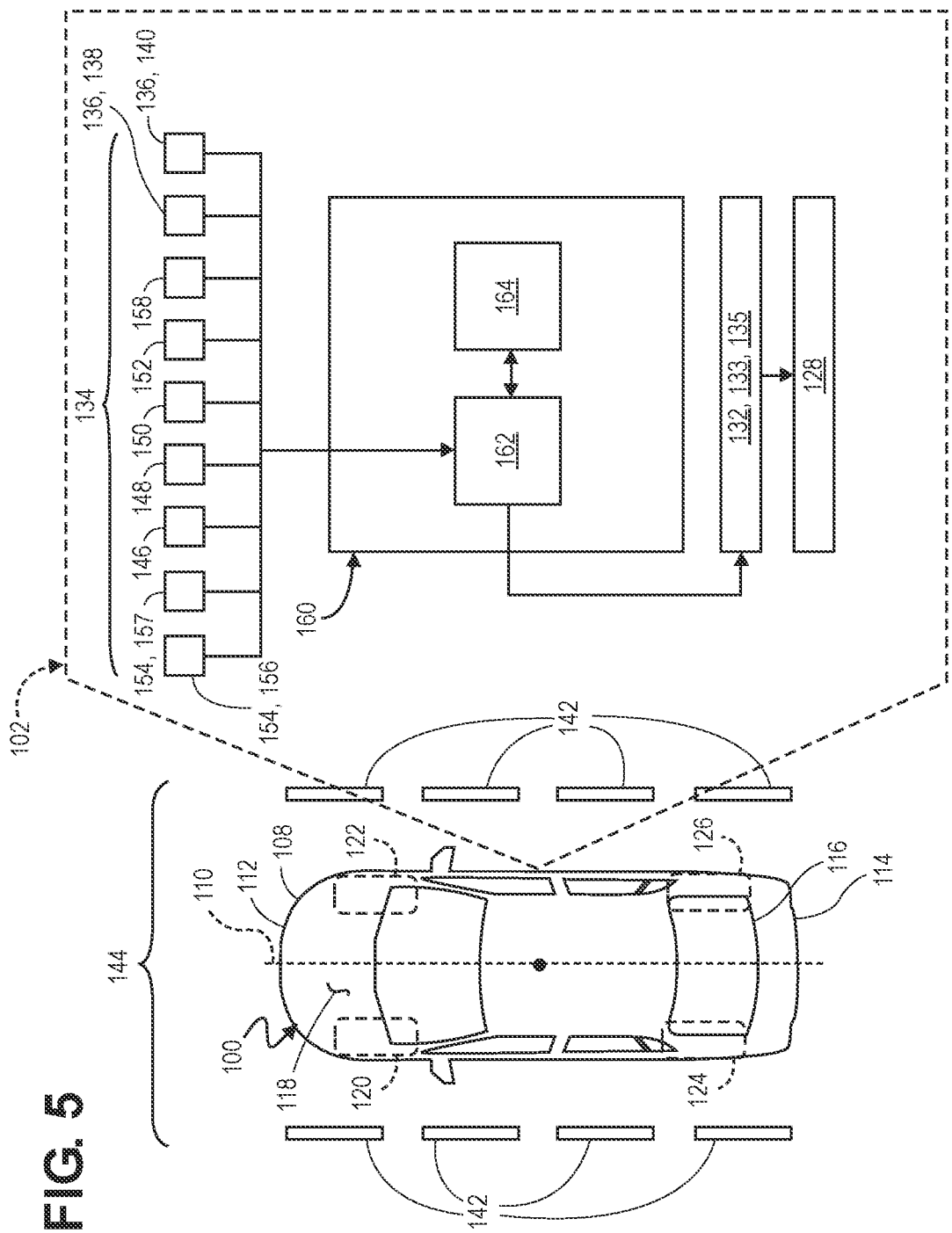
FIG. 5 is a schematic block diagram of the motor vehicle of FIG. 1.

Referring to FIG. 5, the system 102 further includes multiple sensors 134 for detecting road conditions that impart momentum to the motor vehicle 100. These sensors 134 may include one or more cameras 136 adapted to be mounted to the motor vehicle 100 and directed along the longitudinal centerline 110 (FIGS. 1 and 2) of the motor vehicle 100. In this example, one camera 136 is a forward-looking camera 138 directed toward the front end 112 of the body 108 and the other camera 136 is a rearward-looking camera 140 directed toward the rear end 114 of the body 108. Each camera 138, 140 generates a video signal, in response to the associated cameras 138, 140 capturing one or more lane markings 142 associated with a boundary of a driving lane 144.

The sensors 134 further include a plurality of wheel speed sensors 146, 148, 150, 152 for generating a plurality of speed signals that correspond to a speed of an associated one of the wheels 120, 122, 124, 126. Continuing with the previous non-limiting example, the motor vehicle 100 is a front-wheel drive vehicle. In one non-limiting example, as shown in FIG. 1, a first wheel, e.g., the front left wheel 120, can slip on ice and accelerate, and a second wheel, e.g., the front right wheel 122, can grip a dry road surface and impart a momentum 106 on the vehicle in a counterclockwise direction. A first wheel speed sensor 146 associated with the front left wheel 120 can generate a first speed signal associated with the speed of the front left wheel 120, and a second wheel speed sensor 148 associated with the front right wheel 122 can generate a second speed signal. The first and second speed signals can indicate that a speed of the front right wheel 122 is below the speed of the front left wheel 122 with the front left wheel 120 suddenly accelerating on, e.g. ice. In another non-limiting example, as shown in FIG. 2, the front right wheel 122 can slip on ice and accelerate, and the front left wheel 120 can grip a dry road surface and impart a momentum 106 on the vehicle in a clockwise direction. The second wheel speed sensor 148 associated with the front right wheel 122 can generate a second speed signal associated with the speed of the front right wheel 122, and the first wheel speed sensor 146 associated with the front left wheel 122 can generate a first speed signal. The first and second speed signals can indicate that a speed of the front left wheel 120 is below the speed of the front right wheel 120 with the front right wheel 122 accelerating on, e.g. ice.

The sensors 134 further include a yaw angle sensor 154 for generating a yaw signal that corresponds to a current yaw angle of the motor vehicle. In this non-limiting example, the yaw angle sensor 154 is a gyroscope 156. In other examples, the yaw angle sensor can be an inertial measurement unit (IMU) 157 or other suitable yaw angle sensors. The sensors 134 further include a steering angle sensor 158 for generating a steering signal that corresponds to a steering angle associated with the direction of the vehicle intended by the driver.

The system 102 further includes the computer 160, which has a processor 162 coupled to the cameras 138, 140, the wheel speed sensors 146, 148, 150, 152, the yaw angle sensor 154, the steering angle sensor 158, and the electric motor 132. As described in detail below, the system 102 further includes a memory 164 including instructions such that the processor 162 is programmed to determine a desired yaw angle of the motor vehicle 100 and actuate the electric motor 132 to angularly rotate the reaction wheel 128 based on the video signal, the speed signals, the yaw signal, and the steering signal.

The memory 164 includes one or more forms of computer readable media, and stores instructions executable by the processor 162 for performing various operations, including as disclosed herein. The processor 162 may be communicatively coupled to, e.g., via the vehicle communications module, more than one local processor, e.g., included in electronic processor units (ECUs) or the like included in the vehicle 100 for monitoring and/or controlling various vehicle components. In this example, the processor 162 is coupled to the local traction processor to monitor traction variables. Non-limiting examples of the traction variables include current wheel speed, current wheel acceleration, current vehicle speed, and current vehicle acceleration. The processor 162 is generally arranged for communications on the vehicle communications module via an internal wired and/or wireless network, e.g., a bus or the like in the vehicle 100, such as a controller area network (CAN) or the like, and/or other wired and/or wireless mechanisms. Via the vehicle communications module, the processor 162 may transmit messages to various devices in the vehicle 100 and/or receive messages from the various devices, e.g., vehicle sensors 134, actuators, vehicle components, a human machine interface (HMI), etc. Alternatively or additionally, in cases where the processor comprises a plurality of devices, the vehicle communications network may be used for communications between devices represented as the computer 160 in this disclosure. Further, as mentioned below, various processors and/or vehicle sensors 134 may provide data to the computer 160. The processor 162 can receive and analyze data from sensors 134 substantially continuously and/or periodically. Further, object classification or identification techniques can be used, e.g., in a processor 162 based on lidar sensor, camera sensor, etc., data, to identify the lane markings 142, a type of object, e.g., vehicle, person, rock, pothole, bicycle, motorcycle, etc., as well as physical features of objects.

The processor 162 can be programmed to compare the speed of one or more of the wheels to the speed of the other wheels in response to the processor receiving speed signals. The processor 162 may determine a slip condition, in response to the processor 162 determining that the speed of one or more wheels is above the speed of the other wheels by more than a predetermined speed threshold. Continuing with the previous example, the processor 162 can be programmed to compare the speed of the first wheel, e.g., the front left drive wheel 120, with the speed of the second wheel, e.g., the front right drive wheel 122. The processor 162 may determine a slip condition of the front left wheel 120, in response to the processor 162 determining that the speed of the front left drive wheel 120 is more than 5 MPH above the speed of the front right drive wheel 122.

In this non-limiting example, the processor 162 may be further programmed to determine a wheel acceleration, in response to the processor 162 receiving the speed signals. The processor 162 can be programmed to compare the wheel acceleration for any individual wheel to a predetermined acceleration threshold. The processor 162 can be further programmed to determine the slip condition, in response to the processor 162 determining that the wheel acceleration is above the predetermined acceleration threshold.

The processor 162 is further programmed to determine an estimated yaw angle α (FIGS. 1 and 2) between the lane markings 142 or boundary of the driving lane 144 and the longitudinal centerline 110 of the motor vehicle 100 based on the video signal. The processor 162 can execute any suitable image classification software for recognizing the lane markings 142 or other boundary representing the driving lane 144. The processor 162 is further programmed to determine the current yaw angle based on the yaw signal, in response to the processor 162 determining that the cameras 138, 140 did not capture the lane markings 142 when, for example, the cameras 136 are occluded with ice or snow. The processor 162 is further programmed to compare the estimated yaw angle to the desired yaw angle and generate the actuation signal, in response to the processor 162 determining that the estimated yaw angle is above the desired yaw angle. The processor 162 can determine the slip condition if the estimated yaw angle is above the desired yaw angle by more than the predetermined threshold.

The processor 162 is further programmed to generate an actuation signal associated with the desired yaw angle, in response to the processor 162 determining the slip condition. The electric motor 132 angularly rotates the reaction wheel 128 at a predetermined angular rate in a predetermined rotational direction to produce the counter-acting torque 104 that rotates the motor vehicle 100 to the desired yaw angle based on the actuation signal from the processor 162. Continuing with the previous non-limiting example where the road conditions impart a counterclockwise momentum 106 (FIG. 1) to the body 108 of the motor vehicle 100, the electric motor 132 angularly rotates the reaction wheel 128 at a predetermined angular rate in a clockwise direction to produce the associated counter-acting torque 104 that re-directs the motor vehicle 100 in the original direction intended by the driver. In addition, where the road conditions impart the clockwise momentum 106 (FIG. 2) to the body 108 of the motor vehicle 100, the electric motor 132 angularly rotates the reaction wheel 128 at a predetermined angular rate in a counterclockwise direction to produce the associated counter-acting torque 104 that re-directs the motor vehicle in the original direction intended by the driver.

Figure 6:
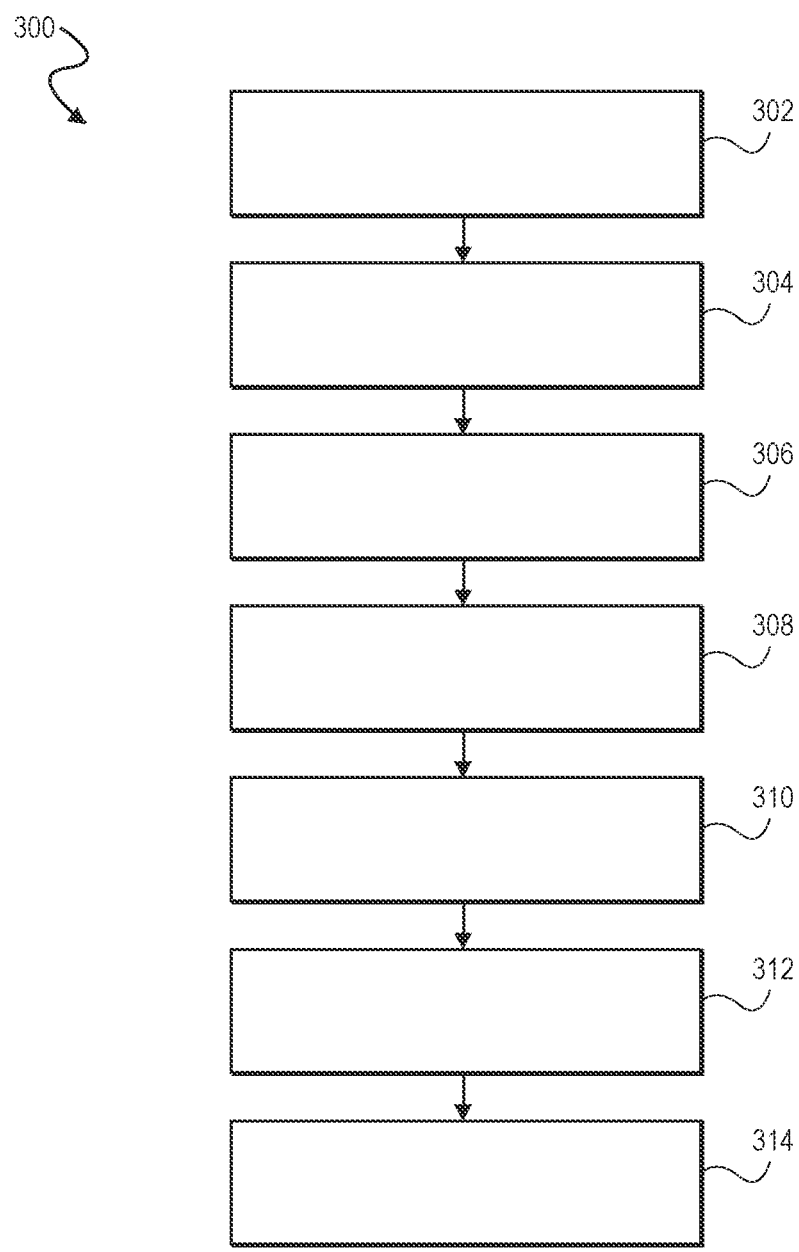
FIG. 6 is a flowchart of one exemplary method of operating the system of FIG. 1.

Referring now to FIG. 6, a method 300 of operating the system 102 of FIG. 1 is provided. The method 300 commences at block 302 with the cameras 136 generating a video signal, in response to the cameras 138, 140 capturing one or more lane markings 142 associated with a boundary of the driving lane 144. The yaw angle sensor 154 generates the yaw signal that corresponds to a current yaw angle of the motor vehicle 100. The wheel speed sensors 146, 148, 150, 152 generate the speed signals that correspond to a speed of an associated one of the wheels 120, 122, 124, 126. The steering angle sensor 158 generates a steering signal that corresponds to a steering angle.

At block 304, the processor 162 determines a desired yaw angle of the motor vehicle 100 based on the video signal, the speed signals, the yaw signal, and the steering signal. As one non-limiting example, the desired yaw angle can be zero degrees when the steering angle sensor 158 indicates that the wheels 120, 122 are pointed straight ahead. As another non-limiting example, the desired yaw angle may be above zero degrees when the steering angle sensor 158 indicates that the wheels 120, 122 are turned sharply such that the vehicle 100 is pointed in a different direction than the direction in which the vehicle is travelling. The processor may determine the desired yaw angle by referencing a lookup table for the associated vehicle based on the signals from the sensors 134. However, it is contemplated that the processor may determine the desired yaw angle via machine learning performed during a training phase and updated upon during in-field use.

At block 306, the processor 162 determines if the vehicle 100 is tracking the lane 144. In particular, the processor 162 determines the estimated yaw angle α, in response to the processor 162 receiving the video signal from the cameras 138, 140. If the cameras 138, 140 are occluded by snow or ice, the processor 162 determines the current yaw angle, in response to the processor 162 receiving the yaw signal from the yaw angle sensor 154, e.g., the gyroscope 156 or the IMU 157. The processor 162 compares the estimated or current yaw angle α to the desired yaw angle. If the processor 162 determines that the estimated or current yaw angle α is not above the desired yaw angle by more than a predetermined threshold, the method 300 returns to block 302. If the processor 162 determines that the estimated or current yaw angle α is above the desired yaw angle by more than the predetermined threshold, the method 300 proceeds to block 308.

At block 308, the processor 162 generates an actuation signal associated with the desired yaw angle. In one example, the processor 162 can generate the actuation signal, in response to the processor 162 determining that the estimated yaw angle of ten degrees is above the desired yaw angle of zero degrees by more than a five-degree tolerance.

At block 310, the electric motor 132 angularly rotates the reaction wheel 128 at a predetermined angular rate in a predetermined rotational direction within the horizontal plane to produce the counter-acting torque that rotates the motor vehicle 100 to the desired yaw angle, in response to the electric motor 132 receiving the actuation signal from the processor 162. The processor may determine the angular rate by referencing a lookup table for the associated vehicle, reaction wheel, and electric motor, based on the signals from the sensors 134. However, it is contemplated that the processor may determine the angular rate via machine learning performed during a training phase and updated upon during in-field use.

At block 312, the processor 162 compares the estimated or current yaw angle α to the desired yaw angle. If the processor 162 determines that the estimated or current yaw angle α is above the desired yaw angle by the predetermined threshold, the method 300 returns to block 302. If the processor 162 determines that the estimated or current yaw angle α is not above the desired yaw angle by more than the predetermined threshold, the method 300 proceeds to block 314.

At block 314, the processor 162 generates a terminate signal, and the electric motor 132 is turned off in response to the terminate signal from the processor 162 such that the reaction wheel 128 stops generating the counter-acting torque 104. The method 300 returns to block 302.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, PYTHON, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A yaw stability control system for a motor vehicle having a plurality of wheels and a longitudinal centerline, the yaw stability control system comprising:
    at least one camera adapted to be mounted to the motor vehicle and directed along the longitudinal centerline of the motor vehicle, with the at least one camera generating a video signal in response to the at least one camera capturing at least one lane marking associated with a boundary of a driving lane;
    a plurality of wheel speed sensors for generating a plurality of speed signals that correspond to a speed of an associated one of the wheels;
    a yaw angle sensor for generating a yaw signal that corresponds to a current yaw angle of the motor vehicle;
    a steering angle sensor for generating a steering signal that corresponds to a steering angle;
    a reaction wheel having a moment of inertia and adapted to mount to the motor vehicle for angularly rotating within a horizontal plane;
    an electric motor connected to the reaction wheel for angularly rotating the reaction wheel;
    a processor coupled to the at least one camera, the wheel speed sensors, the yaw angle sensor, the steering angle sensor, and the electric motor; and
    a memory including instructions such that the processor is programmed to:
        determine a desired yaw angle of the motor vehicle based on the video signal, the speed signals, the yaw signal, and the steering signal; and
        generate an actuation signal associated with the desired yaw angle;
    wherein the electric motor angularly rotates the reaction wheel at a predetermined angular rate in a predetermined rotational direction to produce a counter-acting torque that rotates the motor vehicle to the desired yaw angle, in response to the electric motor receiving the actuation signal from the processor; and
    wherein the reaction wheel comprises one of a ring and a solid disc.

2. The yaw stability control system of claim 1 wherein the processor is further programmed to:
    determine an estimated yaw angle between the boundary of the driving lane and the longitudinal centerline of the motor vehicle based on the video signal;
    compare the estimated yaw angle to the desired yaw angle; and
    generate the actuation signal in response to the processor determining that the estimated yaw angle is above the desired yaw angle.

3. The yaw stability control system of claim 2 wherein the processor is further programmed to determine the current yaw angle based on the yaw signal in response to the processor determining that the at least one camera did not capture at least one lane marking.

4. The yaw stability control system of claim 3 wherein the yaw angle sensor comprises at least one of a gyroscope and an inertial measurement unit (IMU).

5. The yaw stability control system of claim 4 wherein the processor is further programmed to:
    determine a wheel acceleration in response to the processor receiving the speed signals;
    compare the wheel acceleration to a predetermined acceleration threshold; and
    determine a slip condition in response to the processor determining that the wheel acceleration is above the predetermined acceleration threshold.

6. The yaw stability control system of claim 5 wherein the plurality of wheels comprises first and second wheels, and the plurality of wheel speed sensors comprises a first wheel sensor for generating a first speed signal associated with the speed of the first wheel and a second wheel sensor for generating a second speed signal associated with the speed of the second wheel, wherein the processor compares the speed of the first wheel to the speed of the second wheel in response to the processor receiving the first and second speed signals, and the processor.

7. The yaw stability control system of claim 1 wherein the electric motor comprises an axial flux motor.

8. The yaw stability control system of claim 7 wherein the axial flux motor comprises an axial brushed DC motor.

9. A motor vehicle comprising:
    a body extending along a longitudinal centerline between front and rear ends;
    a plurality of wheels coupled to the body, the wheels including at least two drive wheels; and
    a yaw stability control system adapted to be mounted to the body, the system comprising:
        at least one camera adapted to be mounted to the motor vehicle and directed along the longitudinal centerline of the motor vehicle, with the at least one camera generating a video signal in response to the at least one camera capturing at least one lane marking associated with a boundary of a driving lane;
        a plurality of wheel speed sensors for generating a plurality of speed signals that correspond to a speed of an associated one of the wheels;
        a yaw angle sensor for generating a yaw signal that corresponds to a current yaw angle of the motor vehicle;
        a steering angle sensor for generating a steering signal that corresponds to a steering angle;
        a reaction wheel having a moment of inertia and adapted to mount to the motor vehicle for angularly rotating within a horizontal plane;
        an electric motor connected to the reaction wheel for angularly rotating the reaction wheel; and
        a processor coupled to the at least one camera, the wheel speed sensors, the yaw angle sensor, the steering angle sensor, and the electric motor; and
        a memory including instructions such that the processor is programmed to:
            determine a desired yaw angle of the motor vehicle based on the video signal, the speed signals, the yaw signal, and the steering signal; and
            generate an actuation signal associated with the desired yaw angle;
        wherein the electric motor angularly rotates the reaction wheel at a predetermined angular rate in a predetermined rotational direction to produce a counter-acting torque that rotates the motor vehicle to the desired yaw angle, in response to the electric motor receiving the actuation signal from the processor; and wherein the reaction wheel comprises one of a ring and a solid disc.

10. The motor vehicle of claim 9 wherein the body includes a trunk, and the reaction wheel and the electric motor are disposed in the trunk.

11. The motor vehicle of claim 10 wherein the processor is further programmed to:
   determine an estimated yaw angle between the boundary of the driving lane and the longitudinal centerline of the motor vehicle based on the video signal;
   compare the estimated yaw angle to the desired yaw angle; and
   generate the actuation signal in response to the processor determining that the estimated yaw angle is above the desired yaw angle.

12. The motor vehicle of claim 11 wherein the processor is further programmed to determine the current yaw angle based on the yaw signal in response to the processor determining that the at least one camera did not capture at least one lane marking.

13. The motor vehicle of claim 12 wherein the yaw angle sensor comprises at least one of a gyroscope and an inertial measurement unit (IMU).

14. The motor vehicle of claim 13 wherein the processor is further programmed to:
   determine a wheel acceleration in response to the processor receiving the speed signals;
   compare the wheel acceleration to a predetermined acceleration threshold; and
   determine a slip condition in response to the processor determining that the wheel acceleration is above the predetermined acceleration threshold.

15. The motor vehicle of claim 14 wherein the plurality of wheels comprises first and second wheels, and the plurality of wheel speed sensors comprises a first wheel sensor for generating a first speed signal associated with the speed of the first wheel and a second wheel sensor for generating a second speed signal associated with the speed of the second wheel, wherein the processor compares the speed of the first wheel to the speed of the second wheel in response to the processor receiving the first and second speed signals, and the processor.

16. The motor vehicle of claim 9 wherein the electric motor comprises an axial flux motor.

17. A method of operating a yaw stability control system of a motor vehicle, the motor vehicle comprising a body extending along a longitudinal centerline between front and rear ends and a plurality of wheels coupled to the body, the method comprising:
   generating, using at least one camera, a video signal in response to the at least one camera capturing at least one lane marking associated with a boundary of a driving lane;
   generating, using a plurality of wheel speed sensors, a plurality of speed signals that correspond to a speed of an associated one of the wheels;
   generating, using a yaw angle sensor, a yaw signal that corresponds to a current yaw angle of the motor vehicle;
   generating, using a steering angle sensor, a steering signal that corresponds to a steering angle;
   determining, using a memory including instructions and a processor, a desired yaw angle of the motor vehicle based on the video signal, the speed signals, the yaw signal, and the steering signal;
   generating, using the memory and the processor, an actuation signal associated with the desired yaw angle; and
   angularly rotating, using an electric motor, a reaction wheel at a predetermined angular rate in a predetermined rotational direction within a horizontal plane for producing a counter-acting torque that rotates the motor vehicle to the desired yaw angle, in response to the electric motor receiving the actuation signal from the processor, with the reaction wheel having a moment of inertia and the reaction wheel comprising one of a ring and a solid disc.

18. The method of claim 17 further comprising:
   determining, using the memory and the processor, an estimated yaw angle between the boundary of the driving lane and the longitudinal centerline of the motor vehicle based on the video signal;
   comparing, using the memory and the processor, the estimated yaw angle to the desired yaw angle; and
   generating, using the memory and the processor, the actuation signal in response to the processor determining that the estimated yaw angle is above the desired yaw angle.

19. The yaw stability control system of claim 5 wherein the processor determines the slip condition in response to the processor determining that a speed of a first drive wheel is more than 5 MPH above a speed of a second drive wheel.

20. The motor vehicle of claim 14 wherein the processor determines the slip condition in response to the processor determining that a speed of a first drive wheel is more than 5 MPH above a speed of a second drive wheel.

* * * * *